United States Patent [19]

Generini

[11] 4,116,783

[45] Sep. 26, 1978

[54] METHOD FOR RECOVERING VARIABLE-VALENCY ELEMENTS AND PURIFYING SEWAGE WATERS

[75] Inventor: Gianni Generini, Ravenna, Italy

[73] Assignee: Anic, S.p.A., Palermo, Italy

[21] Appl. No.: 757,881

[22] Filed: Jan. 10, 1977

[30] Foreign Application Priority Data

Mar. 23, 1976 [IT] Italy ................ 21472 A/76

[51] Int. Cl.² ................................................ C02C 5/12
[52] U.S. Cl. ................................ 204/150; 204/130; 204/149; 204/197
[58] Field of Search ............... 204/130, 150, 149, 186, 204/196, 197

[56] References Cited

U.S. PATENT DOCUMENTS

| 952,842 | 3/1910 | Roche et al. | 204/150 |
| 3,026,259 | 3/1962 | Phillips | 240/150 X |
| 3,392,102 | 7/1968 | Koch | 204/150 X |
| 3,394,064 | 7/1968 | Fonkes et al. | 204/150 |
| 3,766,036 | 10/1973 | McKaveney | 204/150 |

*Primary Examiner*—Arthur C. Prescott
*Attorney, Agent, or Firm*—Ralph M. Watson

[57] ABSTRACT

A method for stripping pollutant metals from sewage waters from ore-treatment installations is disclosed, which comprises the step of using, in a short-circuited electrode system through which the waters to be purified are flowed, a compound of an element which is other than the cathode metal and is more electro-positive than the anode element. Striking results are obtained by treating vanadium-containing sewage waters from gallium-ore treatment plants with silver sulfate in a copper-iron electrode system. The method can be employed to recover other transition metals from liquors which contain them.

7 Claims, No Drawings

METHOD FOR RECOVERING VARIABLE-VALENCY ELEMENTS AND PURIFYING SEWAGE WATERS

This invention relates to a method for recovering variable-valency elements from sewage waters which contain compounds of such elements, and for the concurrent purification of said waters, by an oxidation-reduction reaction which consists in reducing the elements of such compounds to such a lower valency as to permit the subsequent precipitation by the agency of a short-circuited electrode system which is formed by two materials, one of which is less noble and the other is nobler than hydrogen, in the presence of an element other than the one which forms the cathode and which has a more electropositive character than the anode element has.

With the term variable-valency elements there are intended, in this specification, those elements which exhibit several valency states and which in the different valency states exhibit characteristics which vary from those of a metal to those of a non-metallic element (transition elements).

More particulary, the invention relates to the recovery of vanadium which, on the other hand, is a not negligible source of pollution of the superficial waters.

The method of the present invention permits the reduction of the polluting elements from their states of maximum and intermediate valency to a lower valency, at which they can be totally separated by precipitation in the form of hydroxides or of other basic compounds.

As a matter of fact, and more exactly, these elements exhibit, in their maximum valency states, properties of nonmetallic elements and form, in solution, anion radicals which cannot be stripped with the usual methods. With these latter, it is not possible to effect such a separation, not even in the intermediate valency conditions, inasmuch as they do not possess, in this case, well defined chemcial properties and form, consequently, compounds of a different nature, which cannot be rendered insoluble and thus cannot completely be separated.

Members of such a family of elements are, for example, zirconium, hafnium, thorium, vanadium, niobium, tantalum, tungsten, polonium, rhenium and others.

It is known that noble metals or heavy metals and/or elements having the nature of non-metallic bodies, in the form of anions, can be reduced to their lowest valency when they are in solution, by exploiting the voltaic cell principle, that is, by exploiting the oxidation-reduction effect caused by the flux of electrons which is established in a system composed by two different materials, one of which is less noble than hydrogen, the other being nobler than hydrogen. These materials, when placed in mutual contact in the interior or the exterior of the solution concerned, take an anodic and a cathodic behaviour, respectively (See U.S. Pat. No. 4,035,269). Such a system has, as described in that patent, an electrode that is electropositive and an electrode that is electronegative.

The materials which constitute the cell can have different forms and sizes, starting from those of electrodes in the proper sense of electrolytic cells, up to those of particles immersed in the solution which contains the elements to be reduced.

This method, however, has proven to be efficient only in the case of elements which, by reduction, arrive at well defined valency states, whereas it has proved poorly with elements which take variable valency states, such as those cited hereinabove.

It has now been surprisingly found that the characteristics and the performance of such a system can be substantially modified by introducing in the solution which contains the polluting elements to be recovered, a compound of an element other than the one which forms the cathode and which has properties more electropositive than those of the element which is employed as the anode-forming material.

Obviously, the same results can be obtained by preliminarily treating the electrode system with a solution of the above suggested compound. In the case of an iron-copper electrode couple, for example, the addition of very small values of silver sulfate has proven particularly advantageous. It is speculated that it, by originating a fluffy precipitate of metallic silver on the cathode surfaces, will modify the conditions and the trend of the oxidation-reduction reactions.

It is surmised that this occurs both on account of a stronger electrochemical activity of silver and due to the increased active surface of the cathode as caused by the high surface bulkiness of the precipitated silver.

In the ensuing examples, which aim at better illustrating the invention without, however, limiting the same, sewage waters have been treated, as coming from installation of treatment of ores for the extraction of gallium, within apparatus of conventional make as used according to the conventional methods for reducing metallic compounds as contained in sewage waters.

The same method can also be applied to different waters and solutions of different origin.

The apparatus used to reduce the method of this invention to practice is basically formed by a container in which there are the electrodes, at best in the form of granulates, which are connected to each other due to the effect of the liquid to be treated, the latter having been adjusted to an appropriate pH.

The thusly treated liquid is then passed to a flocculation apparatus in which, by alkalization, the precipitation of the hydroxides of the transition elements which are present is caused to take place almost quantitatively, these elements being then recovered from the precipitate by any of the currently adopted methods.

The determination of the polluting elements has been carried out by the flame atomic absorption method, with which detectability limits in the order of 0.5 milligram per liter can be attained.

EXAMPLE 1 (a comparison test)

Three comparative tests have been performed of treatment of sewage waters of the kind referred to above in a column-shaped container having a cross-sectional area of 5 square centimeters, filled with iron and copper granules, to a volume of 700 mls.

The waters to be treated contained, in addition to other impurities, vanadium compounds up to a total of 2,300 milligrams per liter, expressed in terms of elemental vanadium.

The waters, at a pH of 1.0, have been fed to the treatment column at rates of flow of 12, 8 and 6 liters an hour, respectively.

After having been flowed through the column, the emerging waters have been adjusted to a pH of 8.5 by addition of $Ca(OH)_2$, so as to obtain the flocculation of the insoluble basic compounds of vanadium having the lowest valency.

Upon filtration, the residual contents of Va compounds has been determined in the effluent waters, respective values being obtained of 26, 21 and 18 milligrams per liter, expressed in terms of elemental Va. As can be seen, these values are still appreciably high.

EXAMPLE 2

Sewage waters of the kind indicated and containing, among other impurities, Va compounds in amounts equivalent to 2,000 milligrams per liter, at a pH of 0.8, have been fed to a column-container having a flow-passage area of 5 square centimeters filled with copper and iron granules to a volume of 700 mls. Prior to feeding to the reaction vessel, an addition of 10 milligrams per liter of silver sulfate has been carried out.

The working conditions were as follows: Rate of flow 10 liters an hour, velocity 20 meters an hour, specific load 14 liters an hour per liter of filling. The water issuing from the column has been passed to a flocculation container, where a pH of from 7.5 to 8.5 has been established by addition of $Ca(OH)_2$.

Upon filtration, the quantity of residual vanadium has been determined and it has been found that it was less than 0.5 milligrams per liter (in terms of elemental Va).

EXAMPLE 3

In a column-shaped container of the size given in the previous Example and filled with copper and iron granuler again, a 0.01% solution of silver sulfate at pH 1 has been fed until a total of about 50 milligrams has been attained. Subsequently, sewage water from an installation for the treatment of gallium ores has been introduced, which contained about 2,000 milligrams per liter of vanadium salts (expressed as elemental Va) at a pH of 0.8, under the same working conditions as adopted in the previous Example.

The water emerging from the reduction column has been passed to the flocculation vessel, wherein a pH of from 7.5 to 8.5 has been established.

Upon filtration, the water had a contents of Va compounds (evaluated as elemental Va) of less than 0.5 milligrams/liter.

EXAMPLE 4

Sewage waters coming from installations for the treatment of gallium ores and which contained, inter alia, vanadium compounds in an amount of about 1,080 milligrams per liter (measured as elemental Va), at a pH of 1.1, have been treated in the column vessel as suggested in the previous Examples, with a previous addition of a solution of silver sulfate at a pH of 1 up to an amount of about 50 milligrams of silver sulfate. The operating conditions were the same as for the previous Examples. The emerging waters, upon flocculation and filtration, contained less than 0.5 milligrams per liter of vanadium compounds, expressed in terms of elemental Va.

EXAMPLE 5 (on an industrial scale plant)

Treatment tests have been carried out on waters coming from installations for the treatment of gallium ores, containing vanadium compounds, in different percentages, in an installation of large size, susceptible of being used in industry, having a column cross-sectional area of 1.2 square meters and a filling volume of 2 cubic meters. The filling material was copper and iron in granules.

The water to be treated has been fed at a velocity of 20 meters an hour with a rate of flow of 30 cubic meters an hour.

The specific load applied was 15 cubic meters an hour per each cubic meter of filling.

The column had had a solution of silver sulfate at a pH of 1 (acidified by sulfuric acid) flowing therethrough, the solution being formed by 500 grams of silver sulfate in 5 cubic meters of water, until the silver contained in the solution had completely been exhausted.

The types of water fed to the installation contained, respectively, 207, 57, and 2,000 milligrams per liter of Va compounds (expressed as elemental Va) and were at a pH of 2.0, 2.2 and 1.0, respectively.

After having been flowed through the column, subsequently treated in the flocculation vessel at a pH of from 7.5 to 8.5 and filtered, all three kinds of water as treated did not contain any detectable traces of Va compounds (less than 0.5 milligrams/liter).

The solution of silver sulfate has been fed a single time but the apparatus has retained its efficiency along the entire duration of the tests (a few months).

What I claim is:

1. An improved method of removing a variable-valency element from sewage water which contains a compound of said element, with concurrent purification of said water, by an oxidation-reduction reaction whereby the variable-valency element of said compound is reduced to a value that permits precipitation thereof through alkalization, wherein the improvement comprises, causing said sewage water to flow through a shortcircuited electrode system containing a cathode and an anode, one of which is electropositive and the other of which is electronegative, in the presence of an effective amount of an element other than the cathode material and having a more electropositive character than the anode element.

2. A method as claimed in claim 1, wherein the element to be removed is vanadium.

3. A method as claimed in claim 1, wherein the electrode system is a copper-iron system and the compound of an element other than the cathode element and more electropositive than the anode element is a silver compound.

4. A method as claimed in claim 3, wherein the silver compound is silver sulfate.

5. A method as claimed in claim 1, wherein the compound of an element other than the cathode element and more electro-positive than the anode element is added to the sewage water to be treated.

6. A method as claimed in claim 1, wherein the compound of the element other than the cathode element and more electro-positive than the anode element is added directly in the treatment apparatus.

7. A method as claimed in claim 1, wherein the element to be removed is precipitated after reduction, by alkalization, through flocculation, in the form of an hydroxide or another basic compound, and subsequently isolated.

* * * * *